(12) United States Patent
Kusano et al.

(10) Patent No.: US 9,829,889 B1
(45) Date of Patent: Nov. 28, 2017

(54) AUTONOMOUS VEHICLE ADVANCED NOTIFICATION SYSTEM AND METHOD OF USE

(71) Applicant: Toyota Motor Engineering & Manufacturing North America, Inc., Erlanger, KY (US)

(72) Inventors: Kristofer D. Kusano, Ann Arbor, MI (US); Rini Sherony, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/150,570

(22) Filed: May 10, 2016

(51) Int. Cl.
   *G05D 1/02* (2006.01)
   *B60W 50/10* (2012.01)
   *G08G 1/005* (2006.01)
   *G08G 1/0965* (2006.01)

(52) U.S. Cl.
   CPC .......... *G05D 1/0212* (2013.01); *B60W 50/10* (2013.01); *G05D 1/0276* (2013.01); *G08G 1/005* (2013.01); *G08G 1/0965* (2013.01)

(58) Field of Classification Search
   CPC ... G05D 1/0212; G05D 1/0276; B60W 50/10; G08G 1/0965; G08G 1/005
   USPC .......................................................... 701/26
   See application file for complete search history.

(56) References Cited

U.S. PATENT DOCUMENTS

| | | | |
|---|---|---|---|
| 7,095,336 B2 * | 8/2006 | Rodgers | G08G 1/166 340/435 |
| 7,133,767 B2 | 11/2006 | Ogino et al. | |
| 7,382,274 B1 | 6/2008 | Kermani et al. | |
| 7,994,902 B2 | 8/2011 | Avery et al. | |
| 8,788,121 B2 | 7/2014 | Klinger | |
| 8,874,360 B2 | 10/2014 | Klinger et al. | |
| 8,954,252 B1 | 2/2015 | Urmson et al. | |
| 9,008,890 B1 * | 4/2015 | Herbach | B60W 30/00 340/435 |
| 9,008,958 B2 | 4/2015 | Rubin et al. | |
| 9,429,947 B1 * | 8/2016 | Wengreen | B60W 30/00 |
| 9,481,366 B1 * | 11/2016 | Gordon | B60W 30/09 |
| 9,481,367 B1 * | 11/2016 | Gordon | B60W 30/09 |
| 9,483,948 B1 * | 11/2016 | Gordon | G08G 1/166 |
| 2015/0166062 A1 | 6/2015 | Johnson et al. | |
| 2017/0084174 A1 * | 3/2017 | Suzuki | B60W 30/00 |

FOREIGN PATENT DOCUMENTS

CN 201254136 Y 6/2009

* cited by examiner

*Primary Examiner* — Tyler J Lee
(74) *Attorney, Agent, or Firm* — Christopher G. Darrow; Darrow Mustafa PC

(57) ABSTRACT

A method for operating an autonomous vehicle that includes guiding the autonomous vehicle along a planned path of travel. The autonomous vehicle may be brought to a stop along the planned path of travel, during which an operator of the vehicle may offer to allow another vehicle and/or person to pass in front of the stopped autonomous vehicle. The vehicle to which the offer is directed may transmit an acceptance signal in response to the offer signal indicating acceptance of the offer. The acceptance signal may be received by the autonomous vehicle, which may modify its planned path of travel in response to receiving the acceptance signal.

20 Claims, 8 Drawing Sheets

AUTONOMOUS VEHICLE ADVANCED NOTIFICATION SYSTEM AND METHOD OF USE

BACKGROUND

Fully or highly automated (e.g., autonomous or self-driven) driving systems are designed to operate a vehicle on the road either without or with low levels of driver interaction or other external controls. This is enabled through the introduction of sensors, for sensing vehicle parameters and surroundings, and actuators, for controlling different vehicle functionalities, such as steering, throttling and braking. Increased on-board data processing capabilities tie together these sensors and actuators such that the autonomous or semi-autonomous driving capabilities are enabled. When operating in autonomous mode, during which the vehicle operator typically does not control the vehicle, the autonomous vehicle may generate or receive a planned path of travel with instructions for guiding the vehicle from its current location to a selected destination. When running in the autonomous mode the autonomous vehicle may utilize multiple data sources as inputs to perform the autonomous driving, such as detection of surrounding vehicles, traffic lanes, obstacles, data from navigation systems and so on.

While proceeding along its planned path of travel the autonomous vehicle is likely to encounter situations that may require modification of its planned path of travel. For example, the autonomous vehicle may encounter instances in which the vehicle may be blocked from crossing an intersection due to congested traffic patterns, even though it may have the right-of-way. To avoid blocking the intersection the autonomous vehicle may stop outside the intersection to allow traffic to clear before proceeding through the intersection. As a courtesy to other vehicles while stopped at the intersection, the operator of the autonomous vehicle may offer to allow another vehicle or person, such as a pedestrian or bicyclist, to cross in front of the stopped autonomous vehicle, even though the other vehicle or person may not have the right-of-way. The operator of the autonomous vehicle may relay the offer through gestures, such as waiving a hand. The offer may or may not be accepted by the operator of the other vehicle or persons. If the autonomous vehicle is not notified of the offer and/or the other vehicle or persons acceptance of the offer, the autonomous vehicle may proceed along its planned path of travel unaware that the operator of the autonomous vehicle has signaled another vehicle or person to proceed into its planed path of travel, thereby risking collision between the vehicles and/or persons. This conflict could be avoided by providing the autonomous vehicle with advanced notice that another vehicle or person intends on crossing in front of the autonomous vehicle, thereby enabling the autonomous vehicle to modify its planned path of travel accordingly.

SUMMARY

Disclosed is an automated driving system for an autonomous vehicle. The autonomous vehicle is configured to operate in a wide variety of environments similar to a conventional human driver operated vehicle. This may include wide open spaces providing a clear field of view for vehicle sensors, as well as more congested spaces with restricted viewing, such as may be encountered in large metropolitan cities. The later may pose particular navigation difficulties for the autonomous vehicle due to numerous large objects that may block or limit a field of view of vehicle sensors and hinder operation of the autonomous vehicle. In some cities, for example, it is not uncommon for buildings to be located near the street, resulting, for example, in a blind intersection with a limited view of approaching traffic. The close proximity of the buildings and other objects to the street may significantly limit or block the field of view of the vehicle sensors and hinder the sensor's ability to detect the approaching traffic.

The disclosed automated driving system may include a perception system and a computing device for detecting and tracking a location of an object present within an obstructed viewing region blocked from view of sensors associated with the perception system. An obstructed viewing region may be encountered in a variety of conditions, for example, when approaching a blind intersection. The computing device, in conjunction with the perception system, may be configured to identify the obstructed viewing region and detect an external imaging assist device located within a sensor field of the perception system. The imaging assist device may include a reflective surface capable of transmitting an image of the obstructed viewing region to the perception system. The images received by the perception system from the imaging assist device may be analyzed by the computing device for purposes of detecting a hidden object within the obstructed viewing region. A location of the hidden object within the obstructed viewing region may be tracked relative to the autonomous vehicle based on the images received from the imaging assist device. The computing device may transmit a command to an autonomous vehicle system to implement an autonomous vehicle maneuver based at least in part on the tracked location of the hidden object within the obstructed viewing region.

BRIEF DESCRIPTION OF THE DRAWINGS

The various features, advantages and other uses of the present apparatus will become more apparent by referring to the following detailed description and drawings, in which.

DETAILED DESCRIPTION

Figure 1:
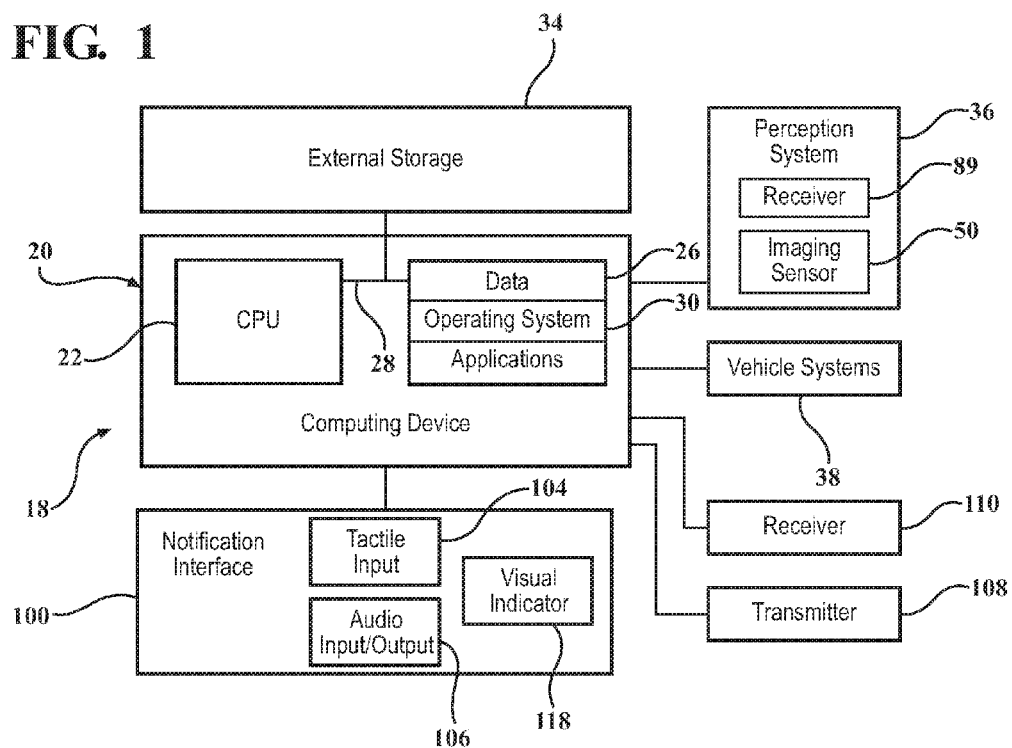
FIG. 1 is a block diagram of a computing device employed with an autonomous vehicle.

An autonomous vehicle advanced notification system and method of use are disclosed. The autonomous vehicle may operate in an autonomous mode in which an autonomous vehicle control system guides the vehicle along a path of travel with little or no input from the vehicle's operator.

When operating in the autonomous mode there may be instances in which certain actions by the operator may require modification of the vehicle's planned path of travel. For example, during a period in which the autonomous vehicle is stopped along its path of travel, as a courtesy to another vehicle, the operator of the autonomous vehicle may elect to wave another vehicle in front of the stopped autonomous vehicle. The autonomous vehicle, however, may resume moving along its path of travel unaware that its operator has waved another vehicle in front of the autonomous vehicle. To avoid a conflict between the two vehicles, which might result in a collision or near collision requiring one or both drivers to take emergency maneuvers, the waved vehicle may transmit an electronic signal notifying the autonomous vehicle that it has accepted the offer from its operator to allow the vehicle to move in front of the stopped autonomous vehicle. The advanced notice provided by the acceptance signal allows the autonomous vehicle to modify its path of travel to avoid potential conflict with the waved vehicle.

Referring now to the discussion that follows and also to the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description. As used herein, the term vehicle shall refer to all forms of motorized and non-motorized human transportation, including but not limited to, motorized vehicles, such as, for example, automobiles, trucks, buses and motorcycles, to name a few, as well as non-motorized transportation, such as, for example, bicycles, wheelchairs, skateboards, scooters and rollerskates.

FIG. 1 is a block diagram of an exemplary autonomous vehicle advance notification system 18 that includes a computing device 20 that may be employed with an autonomous vehicle. Computing device 20 may be any type of vehicle-installed, handheld, desktop, or other form of single computing device, or may be composed of multiple computing devices. The processing unit in computing device 20 may be a conventional central processing unit (CPU) 22 or any other type of device, or multiple devices, capable of manipulating or processing information. A memory 24 in the computing device may be a random access memory device (RAM) or any other suitable type of storage device. Memory 24 may include data 26 that may be accessed by CPU 22 using a bus 28.

Memory 24 may also include an operating system 30 and installed applications 32, including programs that permit CPU 22 to execute the communication processes described below. Computing device 20 may also include secondary, additional, or external storage 34, for example, a memory card, flash drive, or any other form of computer readable medium. The installed applications 32 may be stored in whole or in part in external storage 34 and loaded into memory 24 as needed for processing.

Computing device 20 may also be in communication with a perception system 36 configured to capture data and/or signals for processing by an inertial measurement unit (IMU), a dead-reckoning system, a global navigation satellite system (GNSS), a light detection and ranging (LIDAR) system, a radar system, a sonar system, an image-based sensor system. In general, perception system 36 may be configured to capture information specific to the environment surrounding a vehicle, including information specific to objects, such as features of the route being travelled by the vehicle or other localized position data and/or signals, and outputting corresponding data and/or signals to the CPU 20.

If perception system 36 captures data for a LIDAR system, ranging data relating to intensity or reflectivity returns of the environment surrounding the vehicle may be captured. In the examples described below, perception system 36 may capture, at least, camera-based images and data for a LIDAR system or another system that measures vehicle distance from other vehicles, obstacles, objects, or other geographic features and road infrastructure, including traffic lights and road signs. Computing device 20 may also be in communication with one or more vehicle systems 38, such as a vehicle braking system, a vehicle propulsion system, and a vehicle steering system, in addition to other vehicle systems. One or more of the applications 32 may be configured to send commands to vehicle systems 38 to implement vehicle maneuvers based on the data collected by perception system 36.

Figure 2:
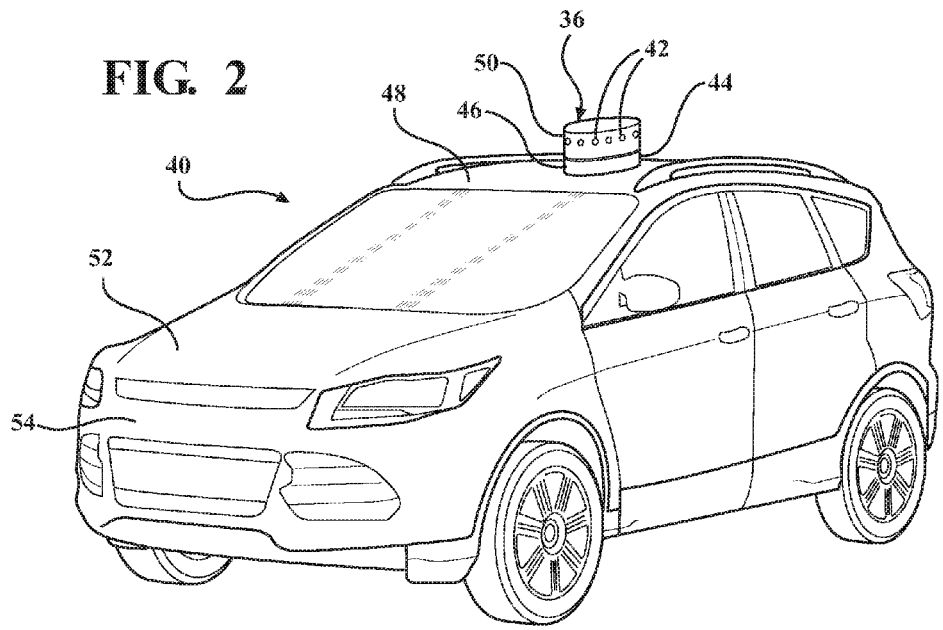
FIG. 2 is a schematic illustration of the autonomous vehicle employing a control system operable for controlling the vehicle when operating in an autonomous mode.

With reference to FIG. 2, an autonomous vehicle 40 may include perception system 36 configured to communicate with computing device 20 (see for example, FIG. 1). Computing device 20 may be located within autonomous vehicle 40 or may be located in an alternate location remote from autonomous vehicle 40. If computing device 20 is located remotely from autonomous vehicle 40, the vehicle and/or perception system 36 may include the capability of communicating with computing device 20.

Perception system 36 may include one or more sensors 42 positioned above autonomous vehicle 40. For example, sensors 42 may be located near an end of a stanchion 44. Stanchion 44 may be configured to rotate or have multiple views to cover a 360-degree area around autonomous vehicle 40. Stanchion 44 may be disposed within a vehicle mount 46 affixed to a roof 48 of autonomous vehicle 40. One or more sensors 42 may also be positioned inside vehicle 40 or integrated with various vehicle components, such as a bumper, roof, windshield and a hood, as well as other vehicle components.

Sensors 42 associated with perception system 36 may be configured to capture images for processing by an image sensor, the distance to objects within the surrounding environment for use by the computing device 20 to estimate position and orientation of the autonomous vehicle 40, or any other data and/or signals that may be used to determine a current state of the environment surrounding autonomous vehicle 40. If sensors 42 are camera-based, sensors 42 may be positioned on stanchion 44 to provide an elevated view of the environment surrounding the autonomous vehicle 40.

Perception system 38 may include multiple interacting components, each configured to perform a particular operation or function. The separate components may be integrated into a single unit, or one or more of the components may be positioned at various locations throughout the vehicle. For example, perception system 38 may include one or more imaging sensors 50 configured to capture images of the environment surrounding autonomous vehicle 40. Imaging sensors 50 are shown incorporated into perception system 36 attached by stanchion 44 to the roof of the vehicle. Alternatively, imaging sensors 50 may be located elsewhere on autonomous vehicle 40, for example, within an interior of the vehicle, such as on a dash, or on an exterior of the vehicle, such as a hood 52 or a front fascia 54. Sensors 42 may be located at any suitable location within or on autonomous vehicle 40 to optimize data and information collection.

Autonomous vehicle 40 is configured to operate in a wide variety of environments similar to a conventional human driver operated vehicle. This may include wide open spaces as well as more congested spaces, such as may be encountered in large metropolitan cities or operating in congested high volume traffic conditions. Autonomous vehicle 40 may employ its array of sensors and systems to guide autonomous vehicle 40 along a selected path of travel from a starting location to a destination location. Various parameters may define the path of travel, such as trajectory, velocity, acceleration and deceleration, as well as others. One or more of the parameters may be modified to accommodate changing operating conditions.

Autonomous vehicle 40 may operate in an autonomous mode in which an autonomous vehicle control system 18 guides the vehicle along its path of travel with little or no input from the vehicle's operator, and a conventional mode in which the vehicle operator controls movement of the vehicle. When operating in the autonomous mode there may be instances in which certain actions by the vehicle operator may require modification of the vehicle's planned path of travel.

Figure 3:
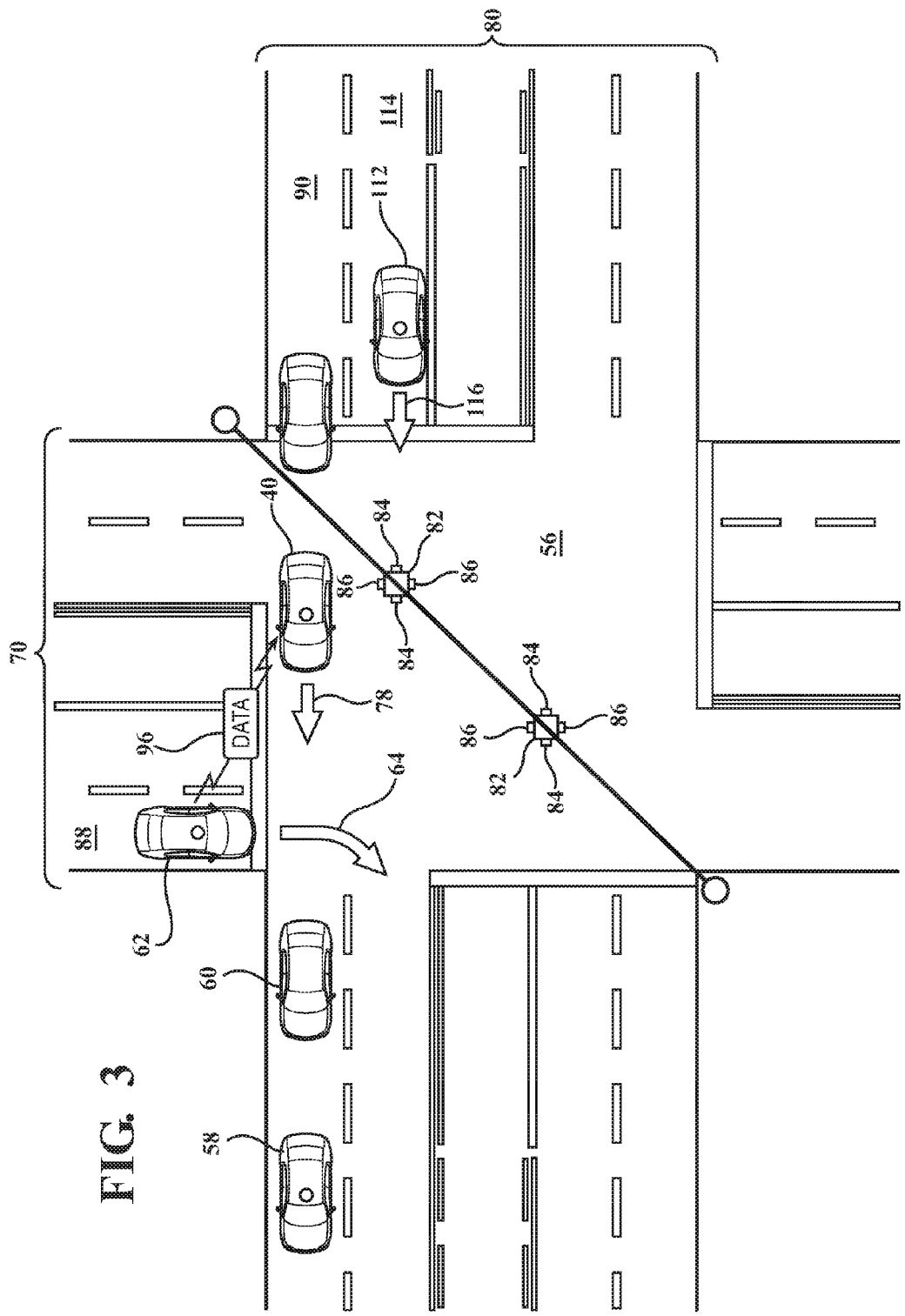
FIG. 3 is a schematic overhead view of the autonomous vehicle operating in an exemplary environment.

For example, FIG. 3 illustrates a scenario in which autonomous vehicle 40 is proceeding through an intersection 56 on a green light. Vehicles 58 and 60 are stopped in front of autonomous vehicle 40, preventing autonomous vehicle 40 from clearing intersection 56. As a courtesy to a vehicle 62 attempting to make a right turn onto the same road that autonomous vehicle 40 is traveling, the operator of autonomous vehicle 40 may wave vehicle 64 to pass in front of stopped autonomous vehicle 40. The operator's actions may require modification of the autonomous vehicle's path of travel to avoid a conflict, such as a collision or near collision that causes the operator of autonomous vehicle 40 to override the system, with vehicle 62 as the vehicle completes its right turn in front of autonomous vehicle 40.

Vehicle 62 may be configured as a conventional vehicle or an autonomous vehicle. Vehicle 62 may have a substantially similar configuration as autonomous vehicle 40, as illustrated in FIGS. 1 and 2. For purposes of discussion vehicle 62 is described as being configured as an autonomous vehicle.

Figure 4:
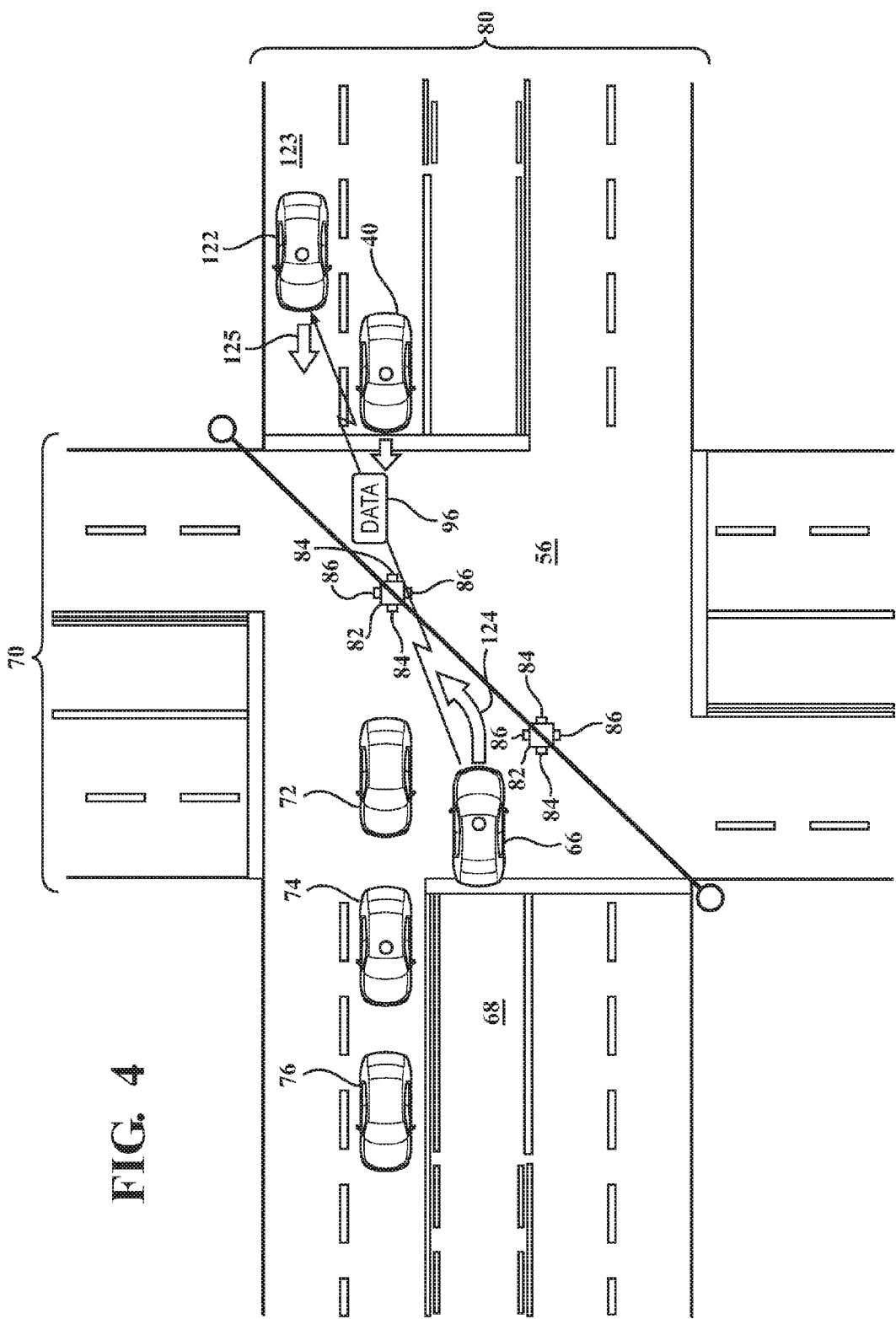
FIG. 4 is an overhead view of the autonomous vehicle operating in a second exemplary environment.

FIG. 4 illustrates a scenario in which autonomous vehicle 40 has a right-of way to proceed through intersection 56 under a green light. Vehicle 66 is in a center left turn lane 68 waiting to turn left onto a cross street 70. Similar to the scenario illustrated in FIG. 3, vehicle 40 is blocked from passing through intersection 56 due to vehicles 72, 74 and 76 stopped in front it. As a courtesy to vehicle 66, the operator of autonomous vehicle 40 may offer to allow vehicle 66 to cross in front of autonomous vehicle 40 and complete its left turn. The actions of the operator of autonomous vehicle 40 (i.e., waiving vehicle 66 to pass in front of autonomous vehicle 40) may require modification of the autonomous vehicle's path of travel to avoid a conflict with vehicle 66 as it completes its right turn. The potential conflict between autonomous vehicle 40 and vehicles 62 and 66 depicted in FIGS. 3 and 4 may be avoided by vehicles 62 and 66 providing advance notification to autonomous vehicle 40 that they have accepted the offer of the operator of autonomous vehicle 40 to allow vehicles 62 and 66 to pass in front of autonomous vehicle 40. The advance notification would enable autonomous vehicle 40 to modify its path of travel in anticipation of vehicles 62 and 66 crossing its path. Operation of the advance notification system is described in more detail below.

Figure 5:
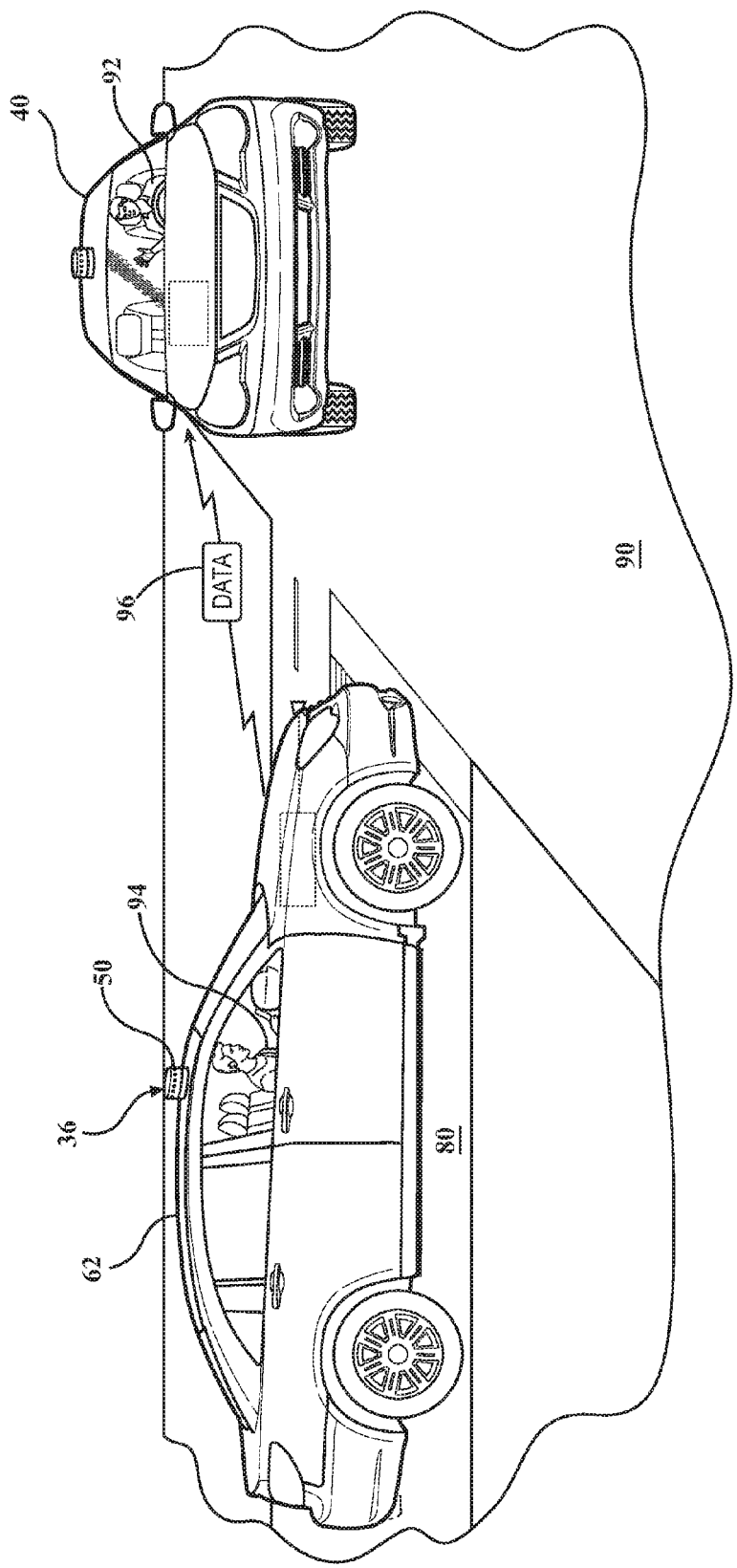
FIG. 5 is a street level view of the operating environment illustrated in FIG. 3.

With reference to FIGS. 3 and 5, autonomous vehicle 40 is shown traveling along a path of travel 78 on a highway 80 configured for two-way traffic. Highway 80 may be configured to include two lanes of traffic in each direction, with a center left turn lane 68. Highway 80 intersects similarly configured cross street 70 at intersection 56. Traffic flow through intersection 56 may be controlled by a pair of traffic lights 82. Traffic flow on highway 80 is controlled by illuminating lamps 84 on traffic light 82 and traffic flow on cross street 70 is controlled by illuminating lamps 86. In the illustrated example, lamps 84 are illuminated green to allow traffic on highway 80 to pass through intersection 56, and lamps 86 are illuminated red. A prospective obstacle, such as vehicle 62, is positioned in a right lane 88 of cross street 70 waiting to make a right turn onto highway 80.

With continued reference to FIGS. 3 and 5, autonomous vehicle 40 is shown traveling in a right lane 90 of highway 80 as it approaches intersection 56. Although autonomous vehicle 40 has a green light and the corresponding right-of-way through intersection 56, traffic congestion in front of autonomous vehicle 40 partially blocks intersection 56 to prevent autonomous vehicle 40 from passing through the intersection. In the illustrated example, vehicles 58 and 60 are stopped in front of autonomous vehicle 40.

With autonomous vehicle 40 stopped in intersection 56, as a courtesy to vehicle 62, an operator 92 of autonomous vehicle 40 may offer to allow vehicle 62 to pass in front of autonomous vehicle 40 and complete its right turn 64 onto highway 80. The offer signal may take various forms, which may include physical gestures, such as waiving a hand (see for example FIG. 5), or verbal communication notifying vehicle 62 that operator 92 of autonomous vehicle 40 has allowed vehicle 62 to pass in front of autonomous vehicle 40 and complete its right turn.

When operating in the autonomous mode, autonomous vehicle 40 may automatically commence traveling along its previously determined path of travel through intersection 56 once traffic sufficiently clears the intersection. This could potentially cause autonomous vehicle 40 to have a conflict with vehicle 62 if the autonomous vehicle's autonomous control system is not notified that vehicle operator 92 has signaled vehicle 62 that it is okay to cross in front of autonomous vehicle 40 and complete its right turn onto highway 80. This risk can be avoided by an operator 94 of vehicle 62 (see for example FIG. 5) causing vehicle 62 to transmit an acceptance signal 96 notifying autonomous vehicle 40 that vehicle 62 has accepted the offer to allow vehicle 62 to complete its right turn in front of autonomous vehicle 40.

Figure 6:
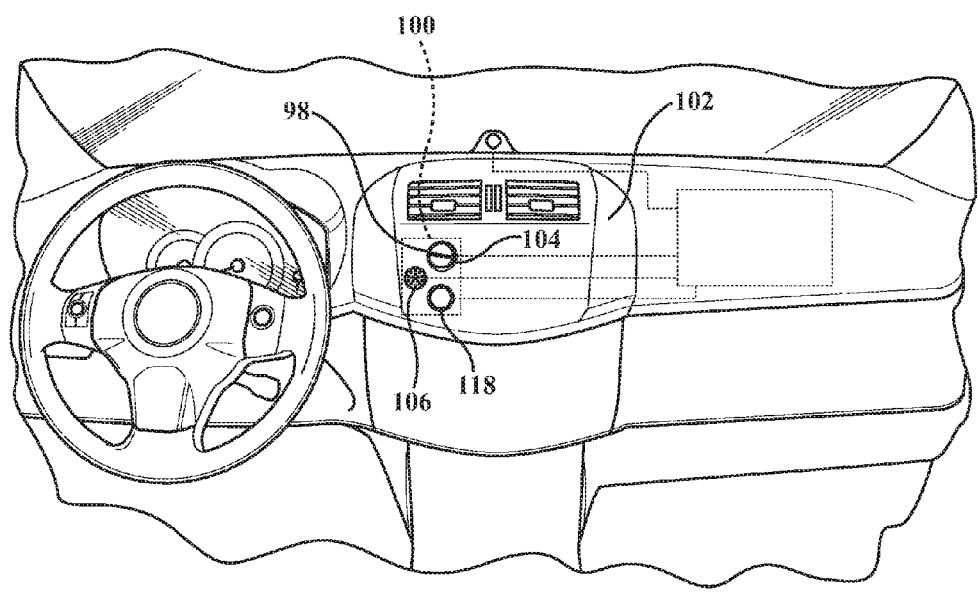
FIG. 6 is interior view of an exemplary vehicle employing a notification interface.

With reference also to FIG. 6, the acceptance signal 96 may be activated by operator 94 of vehicle 62 manually actuating a switch 98, located within vehicle 62, or by way of a verbal command. Vehicle 62 may include, for example, a notification interface 100 conveniently arranged at a readily accessible location within an interior of vehicle 62. Notification interface 100 may be located in variety of locations within vehicle 62, for example, along a center dash console 102. In practice notification interface 100 may be located at any reasonably accessible location within vehicle 62. Autonomous vehicle 40 may include a similarly configured notification interface 100.

Notification interface 100 may include a tactile input device 104 that may include touch actuation, such as switch/button 98 or a differently configured touch input device.

Notification interface 100 may also include an audio input/output device 106 for receiving verbal commands to initiate transmission of acceptance signal 96.

Notification interface 100 may be electronically connected to computing device 20. Operator 94 of vehicle 62 may manually initiate transmission of acceptance signal 96 by touching or depressing tactile input device 104, thereby sending a signal to computing device 20 to commence transmitting acceptance signal 96. Operator 94 may alternatively initiate transmission of acceptance signal 96 through verbal commands that may be detected by audio input/output device 106 and transmitted to computing device 20. Computing device 20 causes a transmitter 108 to electronically transmit acceptance signal 96 in response to the signal received from tactile input device 104 and/or audio input/output device 106. Acceptance signal 96 may be received at a receiver 110 located in autonomous vehicle 40 and transmitted to computing device 20 for processing. In response to receipt of acceptance signal 96 computing device 20 may modify the planned path of travel for autonomous vehicle 40 to avoid a potential conflict with vehicle 62 as it completes its turn in front of autonomous vehicle 40.

Acceptance signal 96 may also be received by other vehicles located in a vicinity of vehicle 62. This allows the other vehicles to take advantage of the advance notification provided by acceptance signal 96 informing them that vehicle 62 may be crossing their respective paths of travel. The advanced notification gives the surrounding vehicles an opportunity to anticipate movement of vehicle 62 and plan accordingly.

The advance notification may be beneficial for vehicles that do not have a clear line-of-sight to vehicle 62. For example, in FIG. 3 a second vehicle 112 is shown traveling in a left lane 114 of highway 80. Due to positioning of autonomous vehicle 40 between second vehicle 112 and vehicle 62, second vehicle 112 may not have a clear view of vehicle 62 and may be unable to detect and monitor movement of vehicle 62. Since, in this example, the path of travel 116 of second vehicle 112 through intersection 56 is not blocked by vehicles in front of second vehicle 112, the vehicle will likely proceed through intersection 56 unaware that vehicle 62 is about to cross its path, potentially resulting in the two vehicles having a conflict with one another. This risk can be avoided by vehicle 62 transmitting advanced notice to second vehicle 112, via acceptance signal 96, providing notice that vehicle 62 may be crossing the path of second vehicle 112. Second vehicle 112 may take advantage of the advance notice to modify its planned path of travel to avoid a potential conflict with vehicle 62.

Acceptance signal 96 may alternatively be initiated automatically upon detecting that operator 92 has offered to allow vehicle 62 to cross in front of stopped autonomous vehicle 40. With reference to FIGS. 1, 2, 5 and 6, vehicle 62 may employ imaging sensors 50 associated with perception system 36 to capture images of operator 92 of autonomous vehicle 62 executing physical gestures, such as waving a hand, which may indicate an offer to allow vehicle 62 to cross in front of stopped autonomous vehicle 40. Images captured by sensors 50 may be transmitted to computing device 20 for analysis. If it is determined that the gestures of operator 92 correspond to an offer to allow vehicle 62 to pass in front of autonomous vehicle 40, computing device 20 may cause transmitter 108 to automatically transmit acceptance signal 96 from transmitter 108 without further input from operator 94 of vehicle 62. An audible or visual notice may also be transmitted to operator 94 providing notice that acceptance signal 96 has been transmitted. The notice may be presented via audio input/output device 106 and/or visual indicator 118.

Location data for tracking a location of vehicle 62 may also be transmitted to autonomous vehicle 40 and surrounding vehicles. The tracking information enables vehicles to monitor a location of vehicle 62.

In the scenario illustrated in FIG. 4, autonomous vehicle 40 is shown traveling along a path of travel 120 on highway 80. In the illustrated example, lamps 84 are illuminated green to allow traffic on highway 80 to pass through intersection 54, and lamps 86 are illuminated red. A prospective obstacle, such as vehicle 66, is positioned in left turn lane 68 and is awaiting traffic to clear to complete a left turn 124 onto cross street 70.

With continued reference to FIG. 4, autonomous vehicle 40 is shown traveling in left lane 114 of highway 80 as it approaches intersection 54. Although autonomous vehicle 40 has a green light and the corresponding right-of-way through intersection 54, traffic congestion in front of autonomous vehicle 40 partially blocks intersection 54 to prevent autonomous vehicle 40 from passing through the intersection. To avoid being stopped in intersection 54 and blocking traffic when lamp 84 of traffic light 82 turns red, the vehicle's autonomous control system may bring autonomous vehicle 40 to a stop outside of intersection 54. If traffic in front of autonomous vehicle 40 sufficiently clears intersection 54 prior to traffic light 82 changing to red, autonomous vehicle 40 may proceed on its selected path of travel through intersection 54. If, on the other hand, traffic light 82 changes to red prior to traffic clearing the intersection, autonomous vehicle 40 can remain stopped outside of intersection 54 and await traffic light to turn green before proceeding through intersection 54.

With autonomous vehicle 40 stopped outside intersection 54 and traffic lamp 82 green for vehicles traveling on highway 80, as a courtesy to vehicle 66, operator 92 (see FIG. 5) of autonomous vehicle 40 may offer to allow vehicle 66 to pass in front of autonomous vehicle 40 and complete its left turn onto cross street 70. The offer signal may take various forms, which may include physical gestures, such as waiving a hand, or verbal communication notifying vehicle 66 that operator 92 of autonomous vehicle 40 is allowing vehicle 66 to pass in front of autonomous vehicle 40 and complete its left turn.

When operating in the autonomous mode, autonomous vehicle 40 may proceed to enter intersection 54 under a green light once traffic sufficiently clears. This could potentially cause autonomous vehicle 40 to have a potential conflict with vehicle 66 if the autonomous vehicle's autonomous control system is unaware that operator 92 has signaled vehicle 66 that it is okay to cross in front of autonomous vehicle 40 and complete its left turn onto cross street 70. This can be avoided by operator 94 causing vehicle 66 to transmit an acceptance signal 96 notifying autonomous vehicle 40 that vehicle 66 has accepted the offer to allow vehicle 66 to complete its left turn in front of autonomous vehicle 40.

The advance notification may be beneficial for vehicles that do not have a clear line-of-sight to vehicle 66. For example, in FIG. 4 a second vehicle 122 is shown traveling in a right lane 123 of highway 80. Due to positioning of autonomous vehicle 40 between second vehicle 122 and vehicle 66, second vehicle 122 may not have a clear view of vehicle 66 and may be unable to detect and monitor movement of vehicle 66. Since, in this example, a path of travel 125 of second vehicle 122 through intersection 56 is not blocked by vehicles in front of second vehicle 122, the vehicle will likely proceed through intersection 56 unaware that vehicle 66 is about to cross its path, potentially resulting in the two vehicles having a conflict with one another. This risk can be avoided by vehicle 66 transmitting advanced notice to second vehicle 122, via acceptance signal 96, providing notice that vehicle 66 may be crossing the path of second vehicle 122. Second vehicle 122 may take advantage of the advance notice to modify its planned path of travel to avoid a potential conflict with vehicle 66.

With reference to FIG. 6, acceptance signal 96 may be activated by the operator 94 of vehicle 66 in a manner previously described. For example, operator 94 of vehicle 66 may manually initiate transmission of acceptance signal 96 by touching or depressing tactile input device 104. Operator 94 may alternatively initiate transmission of acceptance signal 96 thorough verbal commands that may be detected by audio input/output device 106. Acceptance signal 96 may be received at receiver 110 located in autonomous vehicle 40, which may modify its planned path of travel to avoid a potential conflict with vehicle 66 as it completes its left turn onto crossroad 70.

Acceptance signal may also be received by other vehicles located in a vicinity of vehicle 66. In this way the other vehicles may also take advantage of the advance notification informing the other vehicles that vehicle 66 may be crossing their respective paths of travel, thereby providing an opportunity for the surrounding vehicles to anticipate movement of vehicle 66 and plan accordingly.

Figure 7:
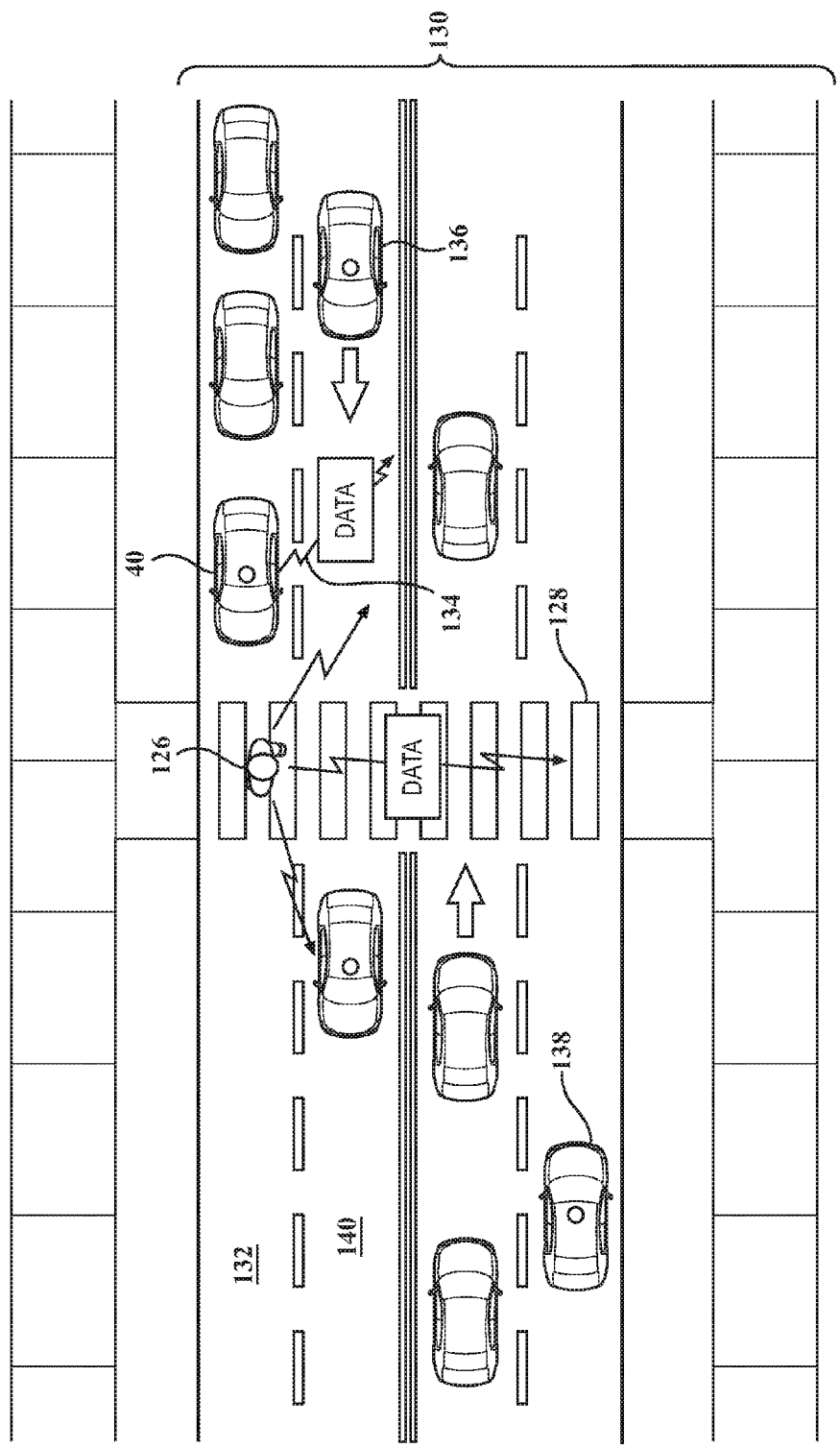
FIG. 7 is an overhead view of the autonomous vehicle operating in a third exemplary environment.
Figure 8:
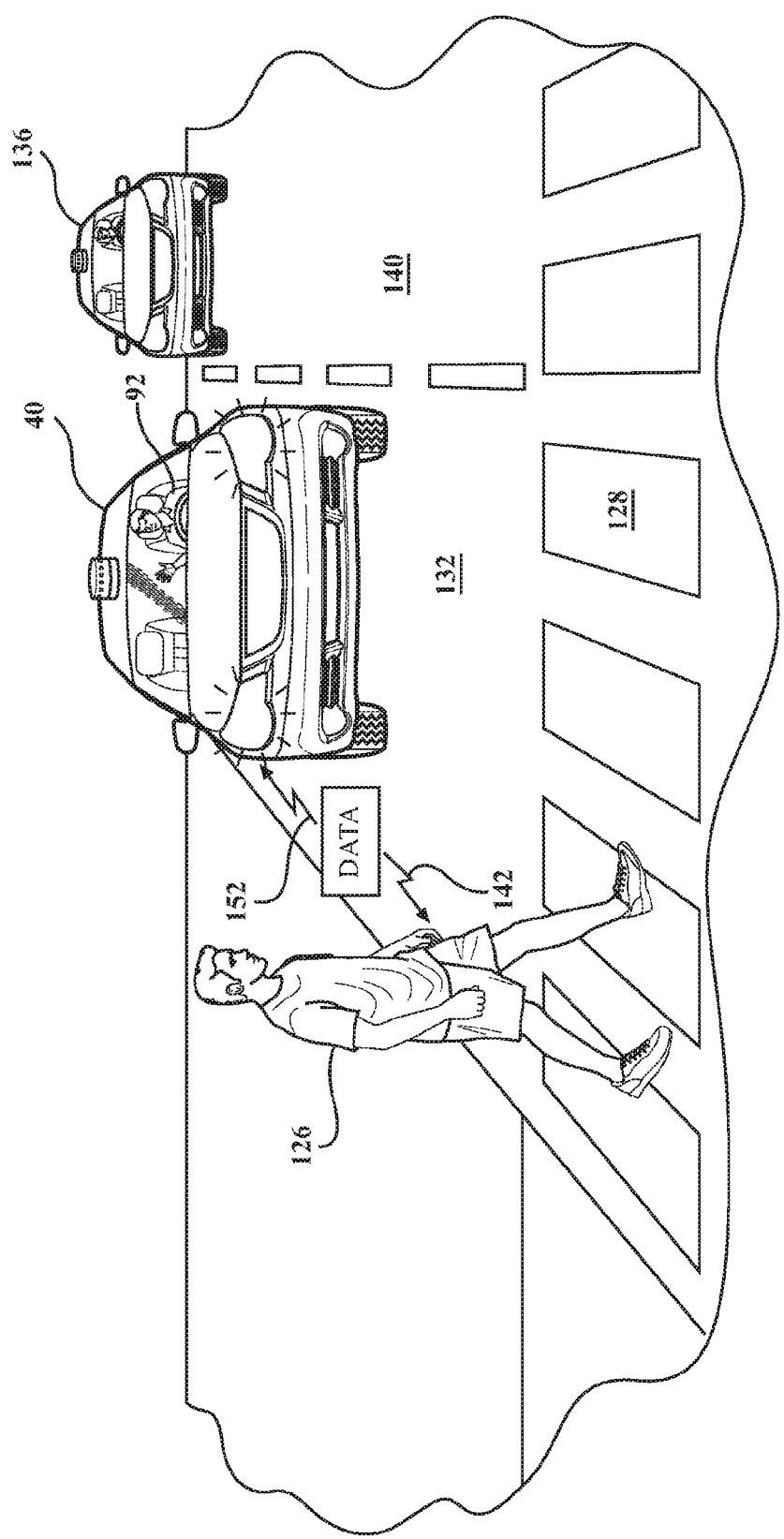
FIG. 8 is a street level view of the operating environment illustrated in FIG. 7.

Advanced notification system 18 may also operate to provide advanced notice regarding anticipated movements of persons, such as pedestrians, bicyclist, motorcycles, as well as other persons not being transported via a four-wheel motorized vehicle. For example, FIGS. 7 and 8 illustrate a scenario in which a pedestrian 126 is waiting to cross a crosswalk 128 extending across a highway 130 configured for two-way traffic. Highway 130 may be configured to include two lanes of traffic in each direction. In practice, highway 130 may alternatively have a different configuration.

With continued reference to FIGS. 7 and 8, autonomous vehicle 40 is shown traveling in a right lane 132 of highway 130 as it approaches crosswalk 128. In this example autonomous vehicle 40 comes to a stop adjacent crosswalk 128 to allow pedestrian 126 to proceed across the crosswalk. With autonomous vehicle 40 stopped at crosswalk 128 operator 92 of autonomous vehicle 40 may transmit an offer signal informing pedestrian 126 that it is okay to proceed across crosswalk 128. The offer signal may take various forms, which may include physical gestures, such as waiving a hand (see for example FIG. 8), or verbal communication notifying pedestrian 126 that operator 92 of autonomous vehicle 40 is allowing pedestrian 126 to proceed across crosswalk 128 in front of autonomous vehicle 40.

To avoid a potential risk of pedestrian 126 being struck by other vehicles traveling along highway 130, operator 92 may cause autonomous vehicle 40 to transmit an electronic notification signal 134 notifying surrounding vehicles that pedestrian 126 is commencing to cross crosswalk 128. Notification signal 134 may be received by surrounding vehicles, for example, vehicles 136 and 138, which may use the notification to adjust their respective paths of travels to avoid potentially striking pedestrian 126.

Referring also to FIG. 6, operator 92 of autonomous vehicle 40 may manually initiate transmission of notification signal 134 by touching or depressing tactile input device 104, thereby sending a signal to computing device 34 with instructions to commence transmitting notification signal 134. Operator 92 may alternatively initiate transmission of notification signal 134 through verbal commands that may be detected by audio input/output device 106 and transmitted to computing device 20. Computing device 20 causes transmitter 108 to electronically transmit notification signal 134 in response to the signal received from tactile input device 104 and/or audio input/output device 106. Location data for tracking a location of pedestrian 126 may also be transmitted in connection with notification signal 134. The tracking information enables vehicles to monitor a location of pedestrian 126.

Notification signal 134 may be received by other vehicles located in a vicinity of pedestrian 62. This allows the other vehicles to take advantage of the advance notification provided by notification signal 134 providing the vehicles notice that pedestrian 126 may be crossing their respective paths of travel. The advanced notification gives the surrounding vehicles an opportunity to anticipate movement of pedestrian 126 and plan accordingly. The advance notification may be beneficial for vehicles that may not have a clear line-of-sight to pedestrian 126. For example, in FIG. 7 vehicle 136 is shown traveling in a left lane 140 of highway 130. Due to the positioning of autonomous vehicle 40 between vehicle 136 and pedestrian 126, vehicle 136 may not have a clear view of pedestrian 126 and may be unable to detect and monitor movement of pedestrian 126. Since vehicle 136 may be unable to detect pedestrian 126 the vehicle may pass through crosswalk 128 unaware that pedestrian 126 may be crossing its path of travel and potentially risking vehicle 136 striking pedestrian 126. This risk may be avoided by autonomous vehicle 40 transmitting advanced notice to vehicle 136, via notification signal 134, that pedestrian 126 may be crossing the path of vehicle 136. Vehicle 136 may take advantage of the advance notice provided by notification signal 134 to modify its planned path of travel and avoid potentially striking pedestrian 126.

Figure 9:
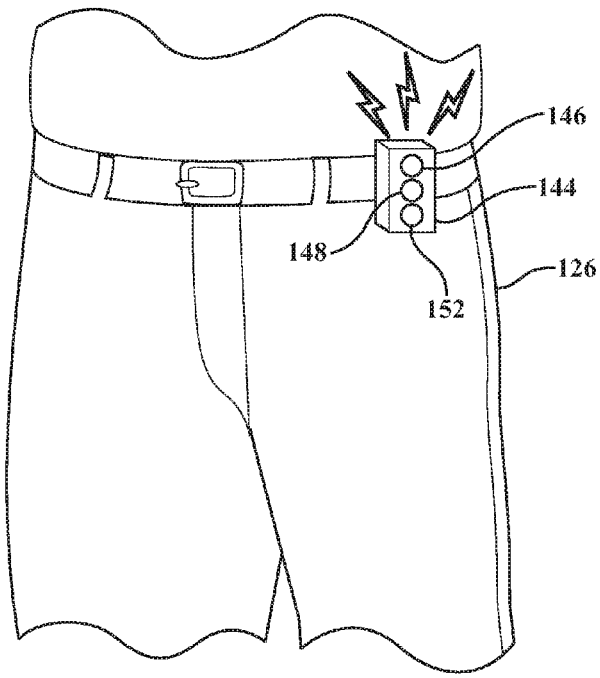
FIG. 9 is a schematic illustration of an exemplary portable transceiver.

With reference to FIGS. 8 and 9, rather than using hand signals to notify pedestrian 126 that it is okay to proceed across crosswalk 128, operator 92 may cause autonomous vehicle 40 to transmit an offer signal 142 to pedestrian 126 notifying the pedestrian that it is okay to proceed across crosswalk 128. Offer signal 142 may be received on a transportable transceiver 144, such as a cellphone, that may be carried on the pedestrian's person. Upon receiving offer signal 142, transceiver 144 may emit an audible or visual notification notifying pedestrian 126 that it is okay to proceed across crosswalk 128. The audible notification may be emitted from an audio input/output device 146, and the visual notification may be emitted from any of variously configured light emitting devices 148. In response to receipt of offer signal 142 from autonomous vehicle 40, pedestrian 126 may elect to have transceiver 144 transmit an acceptance signal 150 notifying autonomous vehicle 40 and surrounding vehicles that pedestrian 126 has accepted the offer to proceed across crosswalk 128.

Pedestrian 126 may initiate transmission of acceptance signal 150 by actuating a tactile input device 152 on transceiver 144. Alternatively, transmission of acceptance signal 150 may be initiated by a verbal command that may be detected by transceiver 144 through audio input/output device 146.

Figure 10:
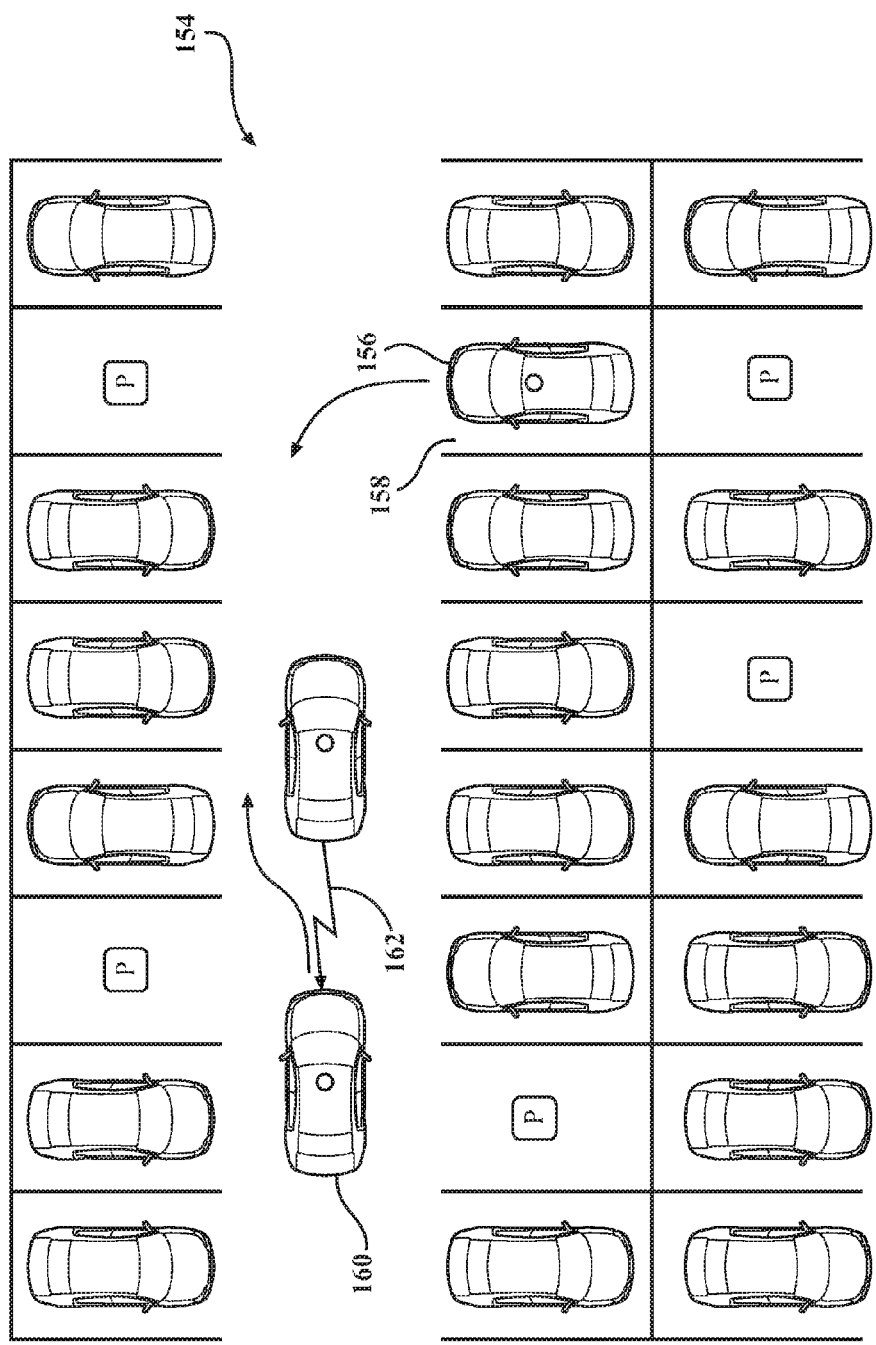
FIG. 10 is an overhead view of the autonomous vehicle operating in a fourth exemplary environment.

FIG. 10 illustrates yet another scenario in which advanced notification system 18 may be used to notify surrounding vehicles of potential hazards. In this example, autonomous vehicle 40 is being guided through a parking facility 154 in search of a parking space. Autonomous vehicle 40 proceeds to detect a vehicle 156 about to vacate a parking space 158. To avoid a potential conflict with vehicle 156, autonomous vehicle 40 comes to a stop a distance away from vehicle 156 to allow the vehicle to safely vacate parking space 158. As autonomous vehicle 40 waits for vehicle 156 to exit its parking space, a second vehicle 160 pulls up behind autonomous vehicle 40. Second vehicle 160 may not be aware that autonomous vehicle 40 is waiting for vehicle 156 to exit parking space 158 because its view is at least partially blocked by autonomous vehicle 40. Unaware of what is occurring in front of autonomous vehicle 40, second vehicle 160 may elect to try and maneuver around autonomous vehicle 40. Such maneuver could potentially cause second vehicle 160 to have a conflict with vehicle 156 if vehicle 156 were to head in a direction of second vehicle 160. To avoid a potential conflict between vehicle 156 and second vehicle 160, operator 92 may cause autonomous vehicle 40 to transmit a notification signal 162 notify surrounding vehicles, including second vehicle 160, that autonomous vehicle 40 is stopped to allow another vehicle (i.e., vehicle 156) to exit a parking space.

With reference to FIG. 6, operator 92 may manually initiate transmission of notification signal 162 by touching or depressing tactile input device 104, thereby sending a signal to computing device 34 to commence transmitting notification signal 162. Operator 92 may alternatively initiate transmission of notification signal 162 through verbal commands that may be detected by audio input/output device 106.

It is intended that the scope of the present methods and apparatuses be defined by the following claims. However, it must be understood that the disclosed systems and methods may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A method in a computing device for operating an autonomous vehicle, the method comprising:
   when coming to a stopped condition of a planned path of travel, detecting by at least one sensor of the autonomous vehicle;
   an offer signal of an autonomous vehicle operator, wherein the offer signal operates to indicate an offer for allowing a prospective obstacle to pass in front of the stopped autonomous vehicle;
   receiving, via the computing device, an acceptance signal from the prospective obstacle responsive to the offer signal, wherein the acceptance signal operates to indicate acceptance of the offer signal; and
   modifying, by the computing device, the planned path of travel of the autonomous vehicle in response to receiving the acceptance signal.

2. The method of claim 1, wherein the offer signal comprises at least one of:
   a physical gesture performed by the autonomous vehicle operator; and
   a verbal communication uttered the autonomous vehicle operator.

3. The method of claim 2, wherein the at least one sensor comprises at least one of:
   an imaging device; and
   an audio device.

4. The method of claim 3, wherein the imaging and audio devices are coupled with the prospective obstacle.

5. The method of claim 1 further comprising:
   employing a notification interface that includes at least one of a tactile input device and an audio input device for initiating transmission of the acceptance signal.

6. The method of claim 5, wherein the notification interface being configured to be transported on a person.

7. The method of claim 1 further comprising:
   receiving a location signal from the prospective obstacle in connection with the acceptance signal, the location signal indicating a location of the prospective obstacle.

8. The method of claim 1, wherein the prospective obstacle comprises at least one of:
   a vehicle;
   a pedestrian; and
   a bicyclist.

9. The method of claim 1 further comprising:
   receiving the acceptance signal at a second vehicle; and
   modifying a path of travel of the second vehicle in response to receiving the acceptance signal.

10. The method of claim 1 further comprising:
    transmitting a warning signal to an operator of a second vehicle for providing notice that the prospective obstacle may be crossing a second path of travel of the second vehicle.

11. The method of claim 1 further comprising:
    maintaining the autonomous vehicle in the stopped condition in response to receipt of the acceptance signal.

12. The method of claim 1 further comprising tracking a location of the prospective obstacle in response to receiving the acceptance signal.

13. A method in a computing device for operating an autonomous vehicle, the method comprising:
    when coming to a stopped condition along a planned path of travel, detecting by a sensor of the autonomous vehicle;
    an offer signal from an operator of the autonomous vehicle to indicate an offer for allowing a prospective obstacle to pass in front of the stopped autonomous vehicle; and
    wherein, in response to the detecting the offer signal:
       transmitting a notification signal for indicating the autonomous vehicle has stopped for the prospective obstacle; and
       modifying, by the computing device, the planned path of travel of the autonomous vehicle.

14. The method of claim 13, wherein the offer signal comprises at least one of:
  a physical gesture performed by the operator of the autonomous vehicle; and
  a verbal communication uttered by the operator of the autonomous vehicle.

15. The method of claim 14, wherein the sensor comprises at least one of:
  an imaging device; and
  an audio device.

16. The method of claim 13, wherein the sensor comprises a tactile input device operable to sense a tactile input being applied to the autonomous vehicle.

17. The method of claim 13 further comprising:
  in response to the detecting the offer signal, transmitting a location signal with the notification signal, the location signal for indicating a location of the prospective obstacle.

18. The method of claim 13, wherein the prospective obstacle comprises at least one of:
  a vehicle; and
  a pedestrian.

19. The method of claim 13 further comprising:
  maintaining the autonomous vehicle in the stopped condition in response to receipt of an acceptance signal.

20. The method of claim 13 further comprising tracking a location of the prospective obstacle in response to receipt of an acceptance signal.

\* \* \* \* \*

UNITED STATES PATENT AND TRADEMARK OFFICE
CERTIFICATE OF CORRECTION

PATENT NO.        : 9,829,889 B1
APPLICATION NO.   : 15/150570
DATED             : November 28, 2017
INVENTOR(S)       : Kristofer D. Kusano and Rini Sherony Page 1 of 1

It is certified that error appears in the above-identified patent and that said Letters Patent is hereby corrected as shown below:

In the Claims

Column 11, Lines 64 to 66, Claim 1 delete:
"mous vehicle;
an offer signal of an autonomous vehicle operator,"
And insert:
--mous vehicle an offer signal of an autonomous vehicle operator,--

Column 12, Line 15, Claim 2 delete:
"uttered the autonomous vehicle"
And insert:
--uttered by the autonomous vehicle--

Signed and Sealed this
Sixteenth Day of April, 2019

Andrei Iancu
*Director of the United States Patent and Trademark Office*